United States Patent

Eisele et al.

[15] 3,701,835

[45] Oct. 31, 1972

[54] MULTIPLE CONDUCTOR CABLE TERMINAL

[72] Inventors: Werner Frank Eisele, Kanata, Ontario; Detlef Zimmermann, Ottawa, Ontario, both of Canada

[73] Assignee: Northern Electric Company Limited, Montreal, Quebec, Canada

[22] Filed: Oct. 12, 1971

[21] Appl. No.: 188,111

[52] U.S. Cl. ........................174/41, 174/44, 174/59, 174/92

[51] Int. Cl. ..............................................H02g 7/06

[58] Field of Search...........174/41, 44, 59, 60, 92, 93

[56] References Cited

UNITED STATES PATENTS

| | | | |
|---|---|---|---|
| 3,445,585 | 5/1969 | Meisel et al. | 174/59 |
| 3,376,542 | 4/1968 | Vlaminck | 174/60 |
| 1,917,242 | 7/1933 | Emmons | 174/41 UX |
| 2,683,304 | 7/1954 | Channell | 174/41 X |
| 3,138,653 | 6/1964 | Miller | 174/44 |

*Primary Examiner*—Bernard A. Gilheany
*Assistant Examiner*—D. A. Tone
*Attorney*—John E. Mowle

[57] ABSTRACT

A multiconductor cable terminal unit, particularly useful in aerial telephone outside plant applications utilizing unpressurized PVC cable is disclosed. The terminal unit, designed for installation by a telephone lineman provides a limited access cable compartment within which electrical leads from a number of terminal blocks may be spliced into the telephone cable. Thereafter, electrical connection of telephone services via the terminal blocks may be carried on without direct physical access to the telephone cable which is failure prone when handled roughly in the area of the splices.

5 Claims, 5 Drawing Figures

MULTIPLE CONDUCTOR CABLE TERMINAL

FIELD OF THE INVENTION

The present invention relates to apparatus for providing electrical connection and termination of multiple conductor cables. More particularly, it relates to an apparatus for providing convenient electrical access to select conductors in a multiple conductor cable while precluding frequent physical access to the conductors in the cable.

DISCUSSION OF THE PRIOR ART

Until recently, multiple conductor telephone cables were usually metallic sheathed with the interior of the cable being pressurized from a source of dry gas, such as nitrogen. The pressurized cable was thereby protected from penetration of moisture through flaws or small openings in the metallic sheath. Paper was typically used to insulate the individual conductors in the cable, one from the other. It was absolutely necessary that the interior of the cable be maintained in a very dry condition to prevent deterioration of the insulating quality of the paper. Cable terminals used for electrically connecting individual telephones into the cable typically involved a splicing compartment which after installation, of the cable terminal, was filled and sealed with potting compound. Leads spliced to select conductors in the splicing compartment were connected to individual terminals on a fixed count terminal board in a terminal compartment. Also provided was a means for interconnecting the interior atmosphere of the cable across the splicing compartment so that the cable required pressurization from a single source only.

During the past decade, polyvinyl chloride and polyethylene materials have been successfully adapted to the manufacture of multiconductor cables. Improved cables made from these materials are not significantly affected by moisture in the environment and typically are filled with a viscous material, such as jelled petroleum for example, to preclude the interconductor space being occupied by water or other foreign matter.

The improvement in multiconductor cables also simplified the requirements for cable terminals. Such terminals are no longer required to provide a seal in the splicing compartment or a means for interconnecting the internal atmosphere of the cable, across a sealed compartment area. Therefore, a simplified cable terminal is now used which merely provides a free air space compartment within which individual telephone drop wires are individually spliced directly into the cable. To facilitate this of course the outer sheath of a portion of the cable within the compartment is removed at the time of installation of the terminal.

These simplified terminals offered a number of advantages over the previously used terminals. There is no terminal board required as drop wires are spliced directly to the cable thus significantly reducing the material cost of the terminal. There is no compartment required for hermetically sealing the accessed cable thus further reducing the material cost of the terminal. There is considerably less labor cost involved in the initial installation of the terminal.

There is, however, a disadvantage which was not evident in the first years of the simplified terminal's usage but is currently plaguing operating telephone companies. The problem which has become evident is not one directly attributable to the design of the currently used terminal but to the necessary operating practice of telephone companies. A skilled lineman installs a cable terminal. Later, when telephone service is required a relatively unskilled telephone installer connects a telephone to select conductors in the cable. To do this he gains direct access to the cable by removing the access cover of the terminal. After a drop wire is secured to the outside lower portion of the cable housing, it is inserted through a grommet into the interior of the splicing compartment. The installer then splices the pair of leads in the drop wire to the selected pair of conductors in the cable but in doing so typically leaves an excessive amount of slack wire inside the terminal. When a substantial number of telephone services have been connected over a period of time by relatively unskilled installers, the simplified terminal becomes so overcrowded with splices and slack wire that the access cover is not easily replaced. When a simplified terminal becomes quite congested, it is not unlikely, upon the installation of yet an additional telephone service, for the telephone installer to unintentionally disrupt the connection to one or more other previously connected telephone services.

The installer doing the job is limited in experience and in time allowable for the job. Upon completion of his assigned task he checks to see that the phone he has just installed functions correctly and then departs, leaving other customers to report any service interruption which he has unintentionally caused. In addition, it is unlikely that the telephone installer will be required to do further work on any particular terminal. Knowing this, the installer tends to complete his specific assignment as quickly as possible having little or no regard for the quality of his workmanship and the consequences it may have on the telephone service to other customers.

Plagued by rising repair costs, operating companies often replace a severely congested terminal of the simplified type with one of the older, initially far more expensive, cable terminals. However, this necessitates double installation, one initially for use during the expansion period of the terminal usage and the other when the first terminal is removed and the second, far more expensive and reliable terminal, is installed.

SUMMARY OF THE INVENTION

The present invention is a multiconductor cable terminal unit which provides facility for electrically connecting external electrical leads to select electrical leads in a multiconductor cable. The terminal unit comprises a cable compartment for a portion of the cable to reside therein. An inner access cover provides access to the compartment and defines a plurality of terminal block positions, so that when at least one terminal block is inserted in one of the positions, terminals carried by the block may be electrically connected to the select electrical leads in the cable, within the cable compartment. An outer access cover provides access to the inner access cover and the terminals thereon carried so that external electrical leads may be connected to the terminals and thus be electrically connected to the select electrical leads of the multiconductor cable.

BRIEF DESCRIPTION OF THE DRAWINGS

The following drawings are illustrative of an example embodiment of the invention.

DESCRIPTION OF THE PREFERRED EMBODIMENT

An example embodiment of a multiconductor cable terminal unit incorporating the invention will now be described with reference to the accompanying drawings.

Figure 1:
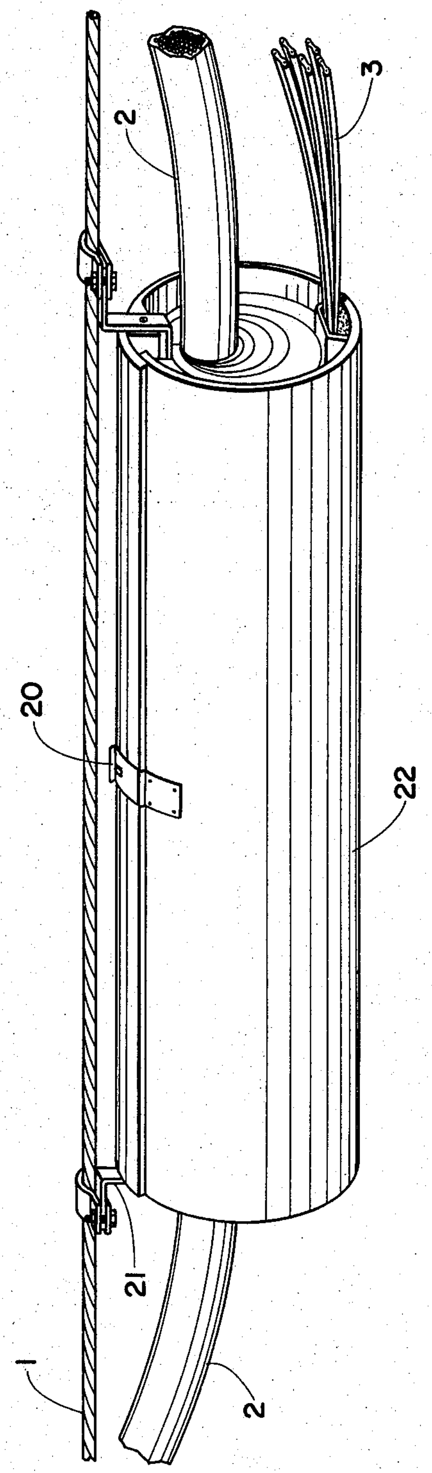
FIG. 1 is an illustration of a multiple conductor telephone cable terminal unit in an aerial installation.

The cable terminal unit in FIG. 1 is shown in an aerial installation with its outer access cover 22 held closed by a spring catch 20. The terminal unit is mounted on a hanger 21 which is clamped to an aerial support cable 1. A multiple conductor aerial telephone cable 2 passes through the unit and telephone drop wires 3 enter one end of the unit wherein there are electrical connections between select conductors in the cable 2 and the drop wires 3.

Figure 2:
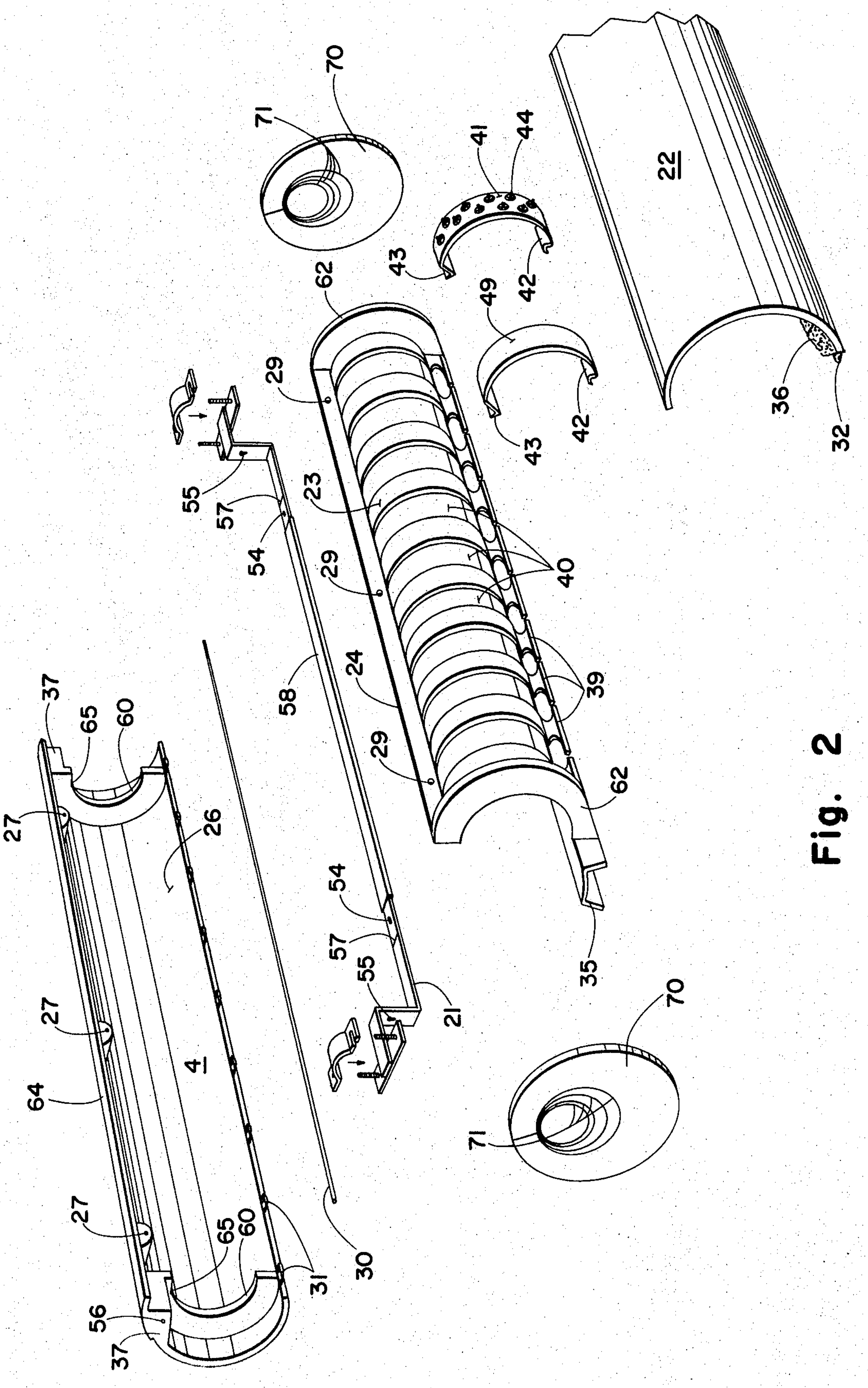
FIG. 2 is an exploded view of the cable terminal unit in FIG. 1.

FIG. 2 illustrates in detail most of the parts which make up the terminal unit in FIG. 1. A half cylindrical body portion 26, with a first pair of transverse interior ribs 60 inset from either end of the body portion 26, defines half of a cable compartment 4, within which the unsheathed portion of the cable 2, in FIG. 1, resides after installation. The outside portion of the upper ends of the ribs 60 each meet locally thickened end portions 37 at the upper ends of the body portion 26. Notches 65 in the ribs 60 reside adjacent the thickened end portions 37. A lower lateral edge of the body portion 26 carries protrusions 31 to facilitate attachment to a hinge rod 30. The hanger 21 carries a pair of measuring marks 57, equidistant from its center point, to act as a measure of the length of the telephone cable 2, in FIG. 1, which is unsheathed during the installation procedure. A pair of cable attachment points 54 are positioned equidistant from the center of the hanger 21 and between the marks 57, so that when the hanger 21 is fitted into the notches 65 the attachment points 54 are contained within the compartment 4. An insulating coating 58, between the attachment points 54, protects individual conductors in the cable 2 from possible electrical contact with the hanger 21. Further, a pair of cable terminal attachment points 55, one in each of the two end flanges of the hanger 21, align with a pair of cable attachment points 56, in each of the two thickened end portions 37. Three attachment lugs 27 are spaced along the upper inner edge of the body portion 26.

A half cylindrical inner access cover 23, with transverse ribs 62, one at either end, defines the other half of the cable compartment 4 and provides ten terminal block positions 40, spaced throughout the length of the cover 23. An inner cover lateral rib 24 along the upper edge of the cover 23 carries three attachment points 29 which align with the lugs 27. A lateral drop wire channel 35, along the lower edge of the cover 23, on one side carries protrusions (not visible in FIG. 2) to fasten to the hinge rod 30. On the other side of the channel 35 fanning protrusions 39 are carried, for routing the drop wires 3 (shown in FIG. 1).

A pair of resilient circular end plugs 70, each having removable marked portions 71 for receiving the cable 2 therethrough, fit into either end of the cable compartment 4 in close contact with the ribs 60 and the inner surface of the inner cover 23.

Each of the terminal block positions 40 may receive a terminal block 41 or a terminal blank 49. Each terminal block 41 and terminal blank 49 are of about the same curvature as the inner access cover 23 so that when a terminal block or blank is fitted into a position 40 it is held against the outer surface of the cover 23 with a catch portion 42 at one end and a resilient snap fastener 43 at the other end. The catch portion 42 and the snap fastener 43 protrude through the cover 23 grasping its inner surface. The terminal block 41 carries, within its body, ten feed-through terminal posts 44 each providing for electrical connection of one conductor in one of the telephone drop wires 3 (in FIG. 1) to a select conductor in the telephone cable 2.

The lower edge of the outer access cover 22 carries protrusions 32 to fasten to the hinge rod 30. The spring catch 20, when the cover 22 is closed, catches on a raised portion 64 on the upper outside edge of the body portion 26 to maintain the terminal unit in a closed configuration. The hinge rod 30 provides common hinged attachment for the inner cover 23 and the outer cover 22 with the body portion 26. The hinge attachment of the outer cover 22 facilitates a second class lever function to force the insertion of a resilient foam material 36, fixed to the lower edge of the outer cover 22, into space not required for the drop wires 3 in the channel 35, upon closure of the outer cover 22. Entry of foreign matter is thus discouraged.

Figure 3:
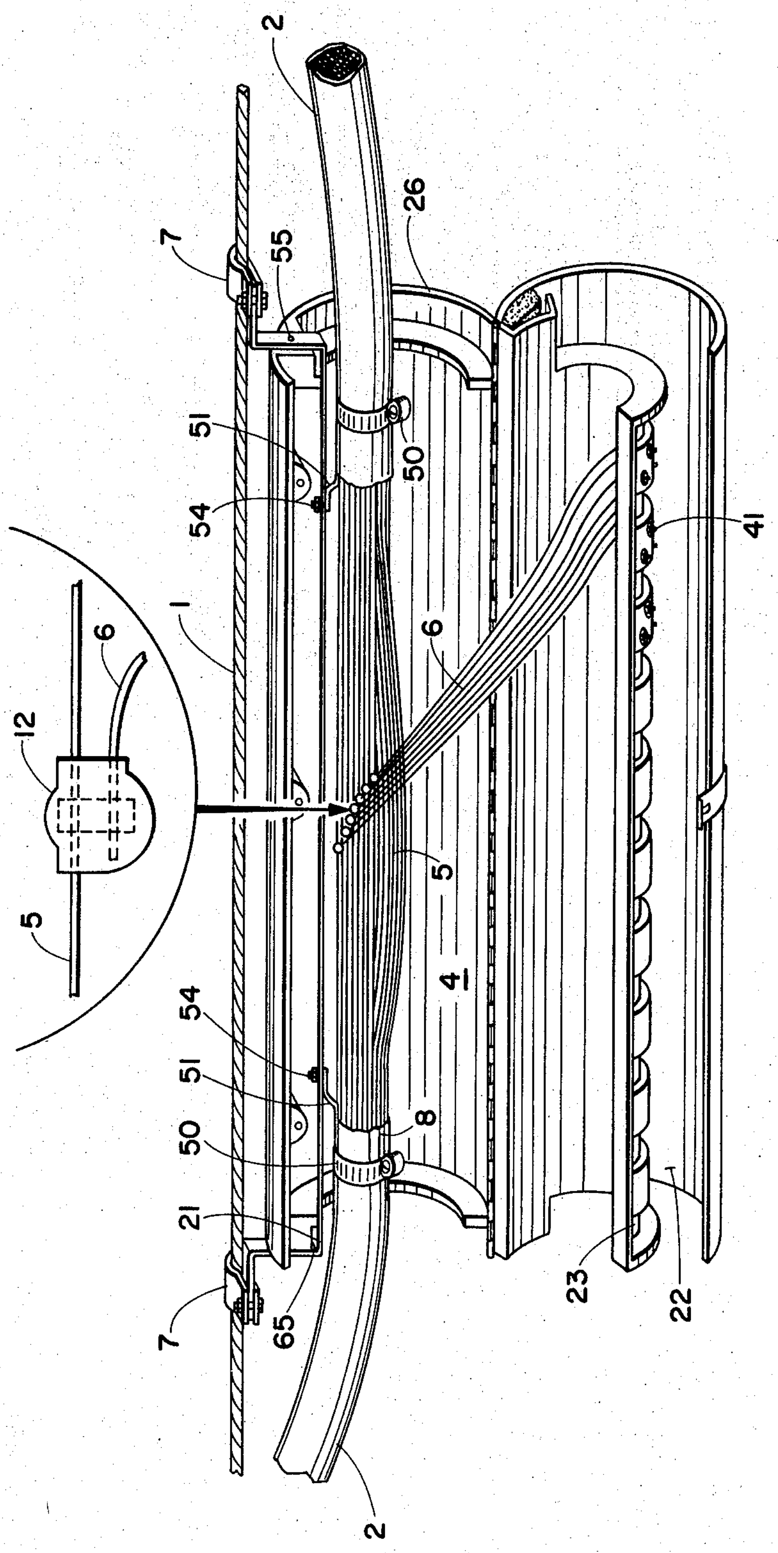
FIG. 3 is an illustration of the cable terminal unit in FIG. 1, with the first and second access covers in an open position, as during installation of the unit by a telephone lineman.

FIG. 3 illustrates the terminal unit in FIGS. 1 and 2, as it appears to a telephone lineman during installation, with the outer cover 22 and the inner cover 23 in the open position. The body portion 26 of the terminal unit is suspended from the hanger 21 at notches 65 and fixed in position at attachment points 55. A clamping assembly 7 at each end of the hanger 21 secures the end flanges of the hanger to the aerial support cable 1. Electrical leads 6 extend from the terminal blocks 41 and are shown spliced onto individual conductors of the multiple conductors 5 of the cable 2. Splices are easily made using SCOTCHLOK connectors 12 shown in the expanded portion of FIG. 3. The cable 2 residing within the open cable compartment 4, is fixed adjacent each end of the hanger 21 by a pair of stainless steel clamps 50, each retaining a perforated metal strap 51 positioned under each clamp 50 between the conductors 5 and the sheath 8 of the cable 2, the perforations gripping the inner surface of the sheath, and the strap 51 being rigidly fixed at the attachment points 54.

Figure 4:
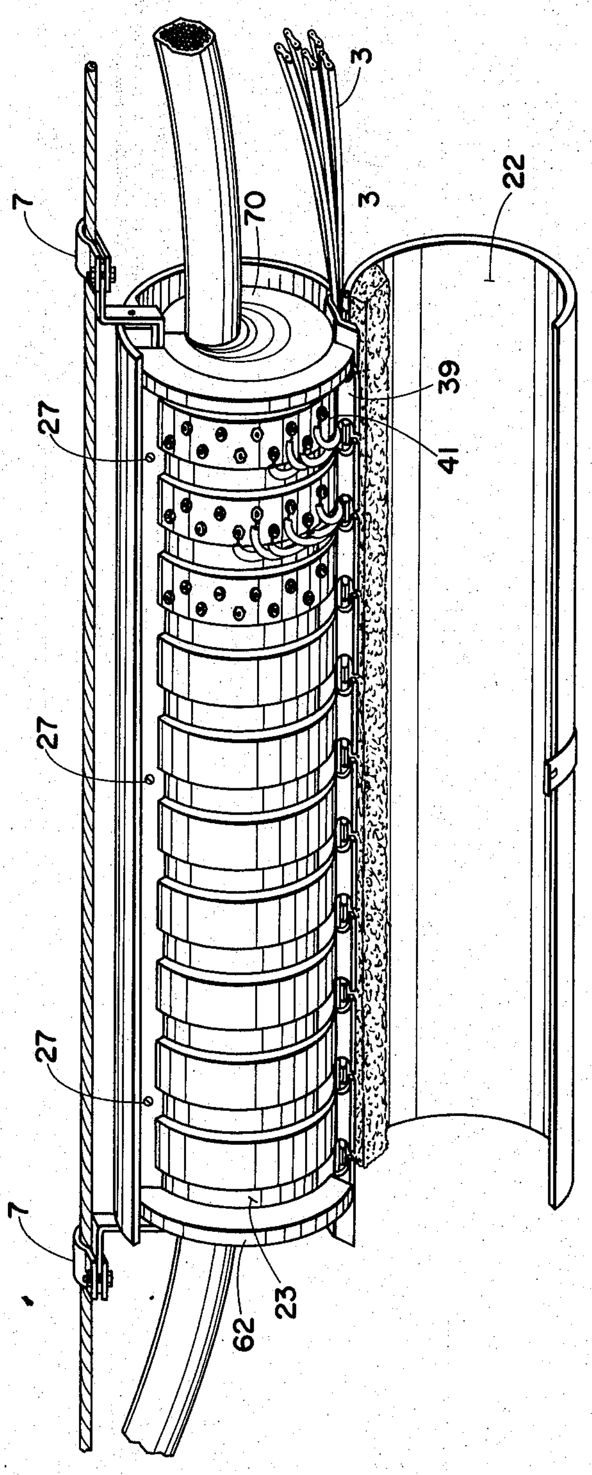
FIG. 4 is an illustration of the terminal unit in FIGS. 1 and 3, with the second access cover in an open position, as during the connection of a subscriber telephone service by a telephone installer.

FIG. 4 illustrates the terminal unit as it appears to the telephone installer during the connection of a telephone service, with the inner cover 23 closed and secured to the body portion 26 by the hinge rod 30 and the attachment points 27. The drop wires 3 are connected to various terminal posts on the terminal blocks 41 as required and are held in neat order by the fanning protrusions 39. The end plugs 70, lodged between the inner surface of the inner cover 23 and the transverse ribs 60, deter the entry of foreign matter into the cable compartment 4. On closure of the outer cover 22 the transverse ribs 62 at either end of the inner cover 22, cooperate with the inner surface of the outer cover 22 to deter the entry of foreign matter into the volume therebetween.

Figure 5:
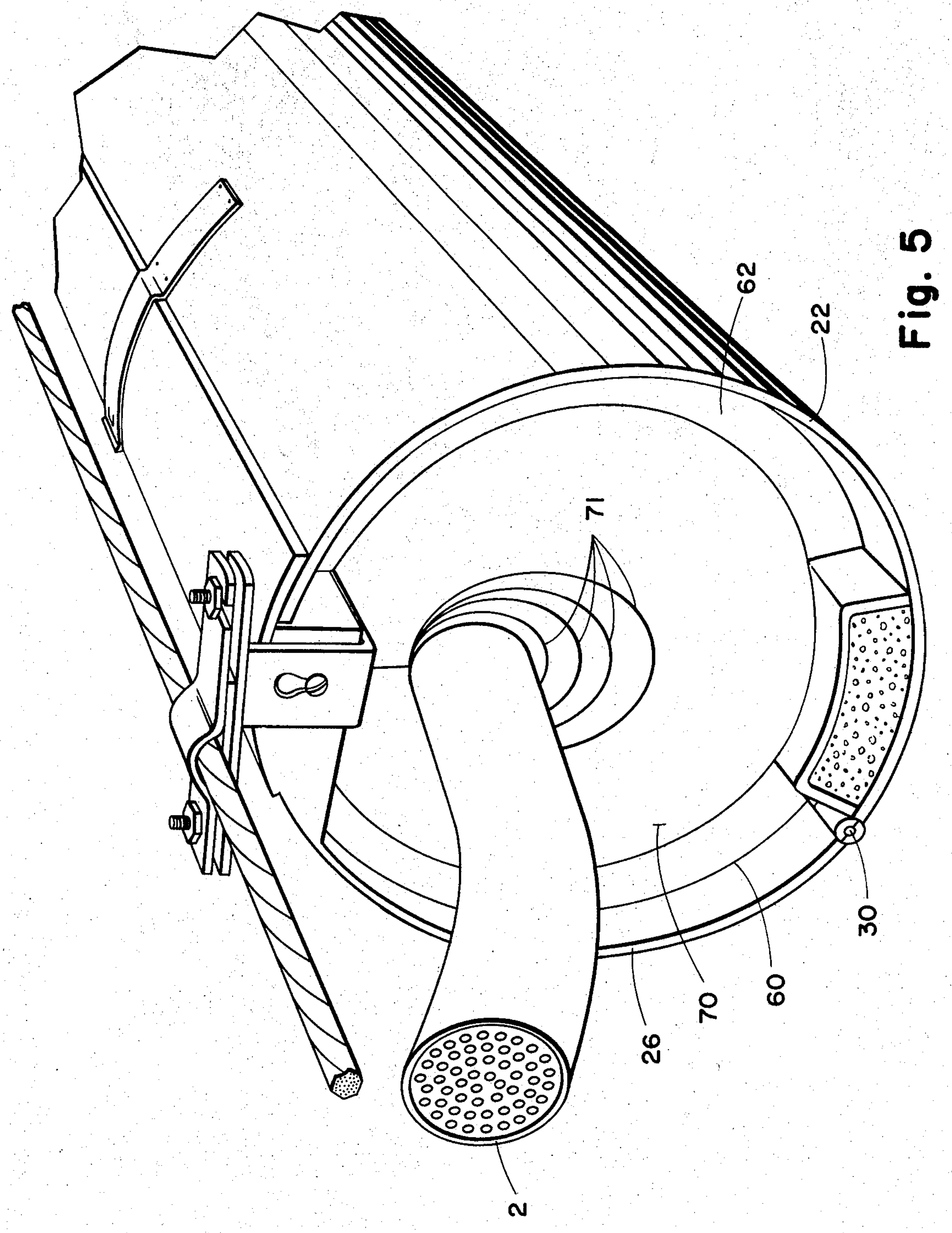
FIG. 5 is an oblique view of one end of the terminal unit in FIG. 1.

FIG. 5 illustrates the detail at one end of the terminal unit in FIG. 1. The end plug 70 fits between one of the transverse ribs 60 and the inner surface of the inner cover 23 (not visible). The telephone cable 2 passes through the space provided by removing one of the portions 71. The transverse ribs 62 cooperate with the inner surface of the outer cover 22 to enclose the volume between the inner cover 23 and the outer cover 22. The hinge rod 30, one end portion here being visible, secures the outer cover 22 to the inner cover 23 and the body portion 26.

Some of the advantages of the cable terminal unit become distinctly evident during its installation. In a typical new aerial installation a telephone lineman first unlashes a portion of the telephone cable 2 from the support cable 1. He then clamps the hanger 21 to the support cable 1, with the clamping assemblies 7. At this point in the installation procedure, the telephone cable 2 is suspended just below and parallel to the hanger 21, so that the lineman can conveniently determine the required area over which the cable 2 must be unsheathed, by making reference to the measuring marks 57 on the hanger 21. After unsheathing the cable 2, the perforated straps 51 are inserted between the inner and outer cable sheaths, one at each end of the unsheathed portion and clamped therebetween by the clamps 50. The free end of each of the two straps 51 is fastened at the adjacent cable attachment point 54 on the hanger 21. At this moment the hanger 21 has been installed and the cable 2 affixed thereto such that the conductors 5 are exposed to permit splicing thereto.

The remaining portion of the cable terminal unit is placed upon the hanger, as a single unit, with the pair of transverse ribs 60 resting upon the hanger 21 at the notches 65. The unit is then secured on the hanger 21 at the attachment points 55. The lineman inserts the required number of terminal blocks 41 into the terminal block positions 40, unrequired terminal block positions 40 being occupied by terminal blanks 49. After splicing electrical leads 6 from the terminal posts 44, to select conductors in the cable 2, the inner cover 23 is closed and secured at the attachment points 27 and the end plugs 70, with portions 71 removed to fit the sheath of the cable 2, are set firmly into the ends of the compartment 4.

Two advantages are now evident in this terminal unit. One is that the typically expensive terminal blocks 41 are installed only in the quantity required thereby providing a cost saving. The second is that the relatively unskilled telephone installer need never gain physical access to the cable compartment 4 and therefore is most unlikely to cause unintentional interruptions in telephone service.

To install a telephone service, the installer gains access to the terminal block 41 by releasing the spring catch 20 and opening only the outer cover 22. He then feeds a drop wire horizontally through the drop wire channel 35 up past one of the fanning projections 39 and connects the conductors in the drop wire to the required pair of terminal posts 44. Upon closure of the outer cover 22, the installation of the telephone service is complete, without risk of unintentional interruption to other existing telephone services.

Although the illustrated and herein described example embodiment is drawn to an aerial installation, the invention is advantageously applicable to a majority of telephone outside plant cable terminal requirements. In large wall mounted installations or in buried cable ground level terminal appearances the terminal would, for convenience, be of a box-like rectangular shape and often of much greater terminal capacity. Aside from the advantages relating to an aerial installation, the terminal would manifest all the other previously described advantages provided by substantially the same means as previously described.

What is claimed is:

1. A multiconductor cable terminal unit for providing facility for electrically connecting external leads to select electrical leads in a multiconductor cable without direct access to the cable after the cable terminal unit has been installed, the cable terminal unit comprising:

a cable compartment for a portion of the cable to reside therein, an inner access cover hinged to the compartment, to provide access to the compartment when the cover is in an open position and to prevent access to the compartment when the cover is in a closed position, the cover having a plurality of terminal block positions so that when at least one terminal block is inserted in one of the positions, terminals carried by the block may be connected to the select electrical leads in the cable within the cable compartment, an outer access cover, hinged to the compartment in common with the inner access cover, to provide access when in an open position, to the inner access cover and the terminals carried thereon so that the external electrical leads may be connected to the terminals and so have electrical connection to the select electrical leads of the cable.

2. The cable terminal unit defined in claim 1 in which the inner access cover further comprises a fanning channel for routing the external leads, the channel being between the terminal block positions and the hinged edge of the cover so that on closure of the outer access cover the external leads are contained in the channel and may exit at either end of the cable terminal unit.

3. The cable terminal unit defined in claim 4 for use as an aerial cable terminal unit and having detachable end plugs to facilitate the installation of the terminal unit upon an aerial cable terminal hanger means, the hanger means being for attachment to the support portion of an aerial cable and carrying the multiconductor portion of the aerial cable so that the multiple conductor portion of the cable is routed through the cable compartment from whence electrical connections may be made from select electrical conductors within the cable to the terminal posts.

4. The cable terminal unit defined in claim 3 in which the hanger means carries a pair of indicating marks positioned to give an indication of that portion of the sheath of the multiconductor cable which is to be removed during installation of the cable terminal unit.

5. The cable terminal unit defined in claim 3 in which the fanning channel is immediately adjacent and parallel to the hinged edge of the inner access cover, the outer access cover further comprising a resilient foam strip fixed to a portion of the inner surface of the outer access cover such that the hinged edge of the outer access cover functions as the fulcrum of a second class lever so that the resilient material is urged into the space in the channel not occupied by the external electrical leads upon closure of the outer access cover.

* * * * *